March 31, 1942.  R. C. TALBOT  2,277,801
LABELING AND STAMPING MACHINE
Filed Sept. 7, 1940  8 Sheets-Sheet 1
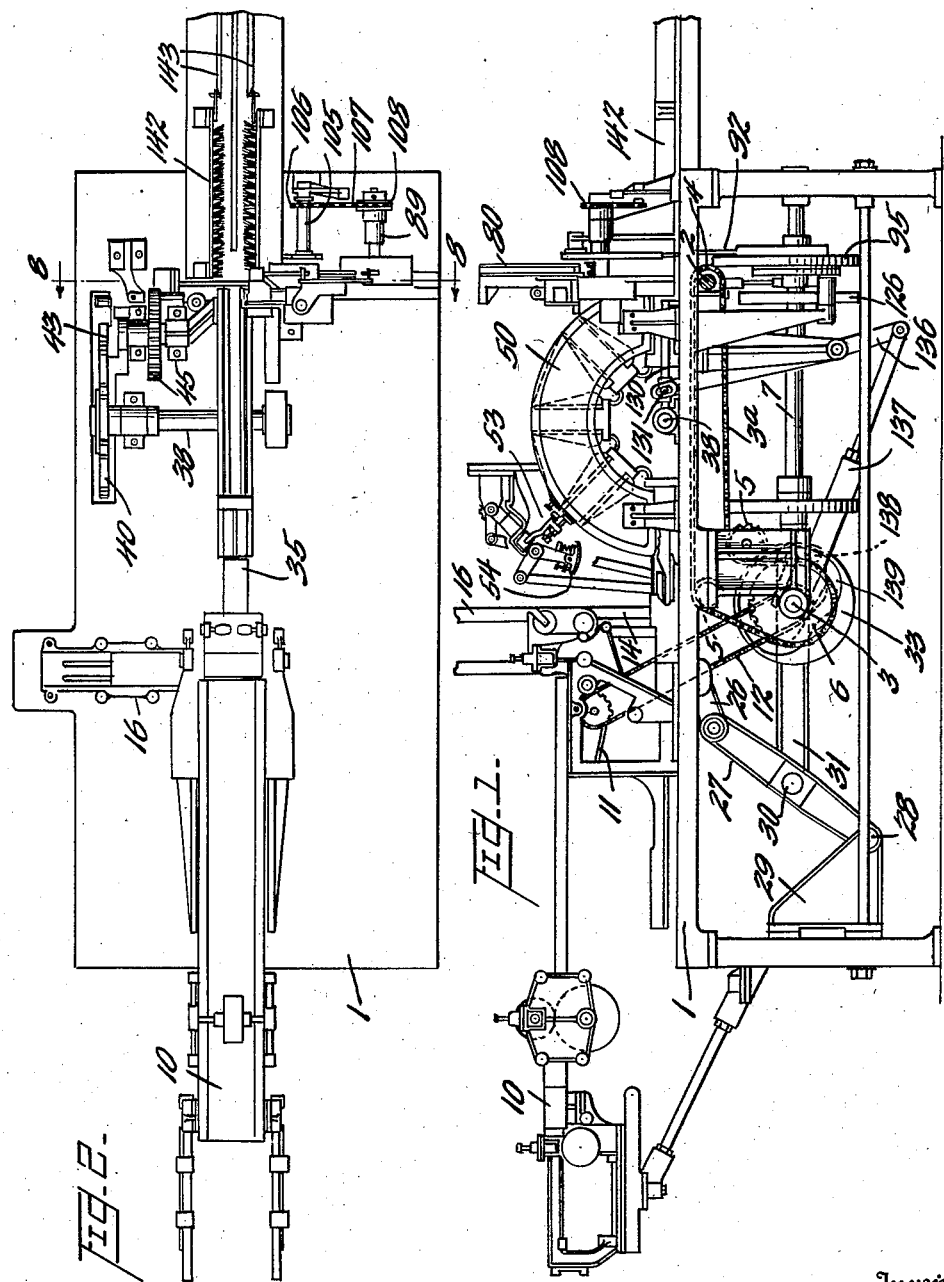
Inventor
Richard C. Talbot,
By Nevius & Bateman
Attorneys March 31, 1942.  R. C. TALBOT  2,277,801
LABELING AND STAMPING MACHINE
Filed Sept. 7, 1940  8 Sheets-Sheet 2
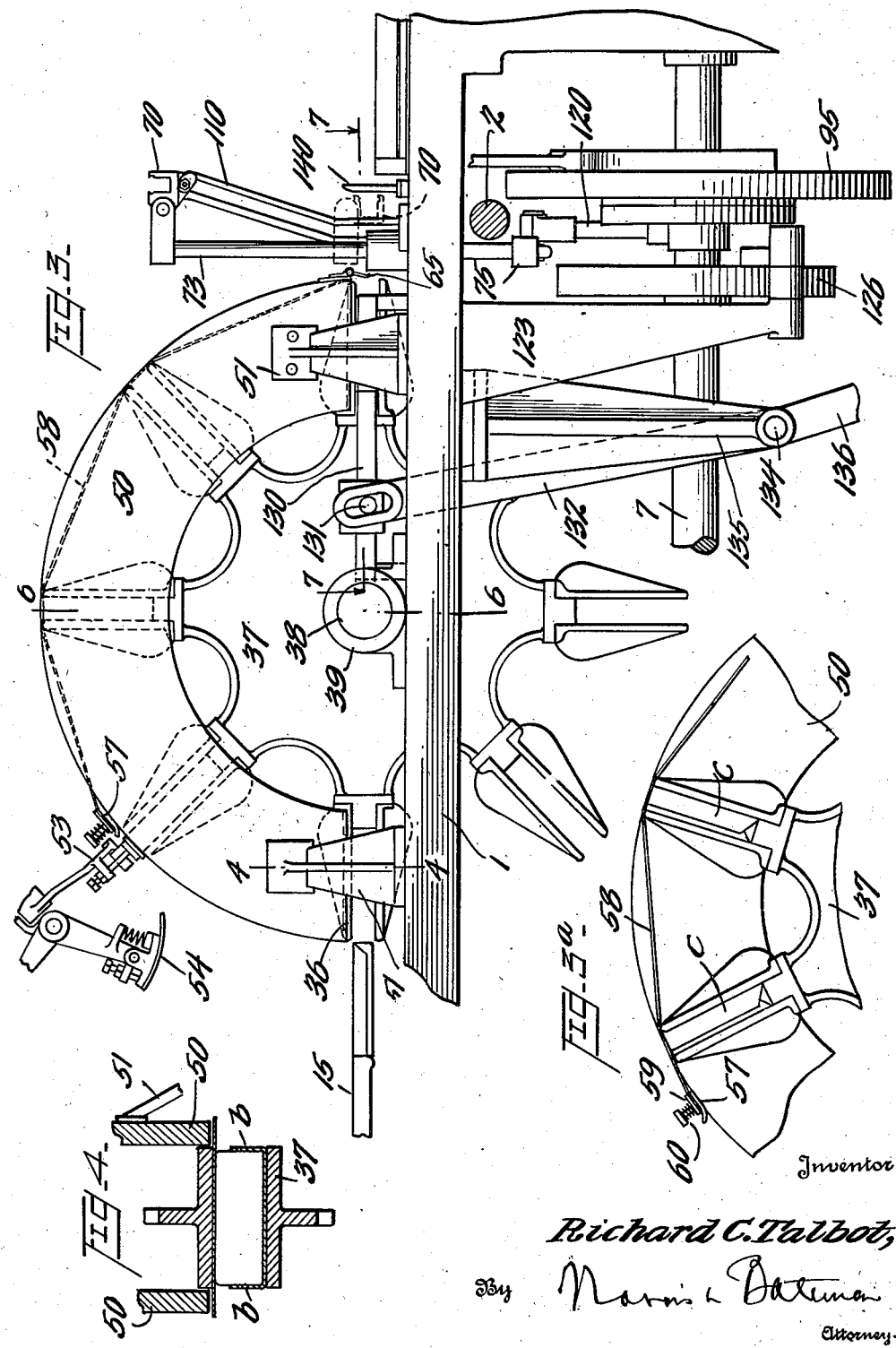
Inventor
Richard C. Talbot,
By Norris L. Bateman
Attorneys March 31, 1942.   R. C. TALBOT   2,277,801
LABELING AND STAMPING MACHINE
Filed Sept. 7, 1940   8 Sheets-Sheet 3
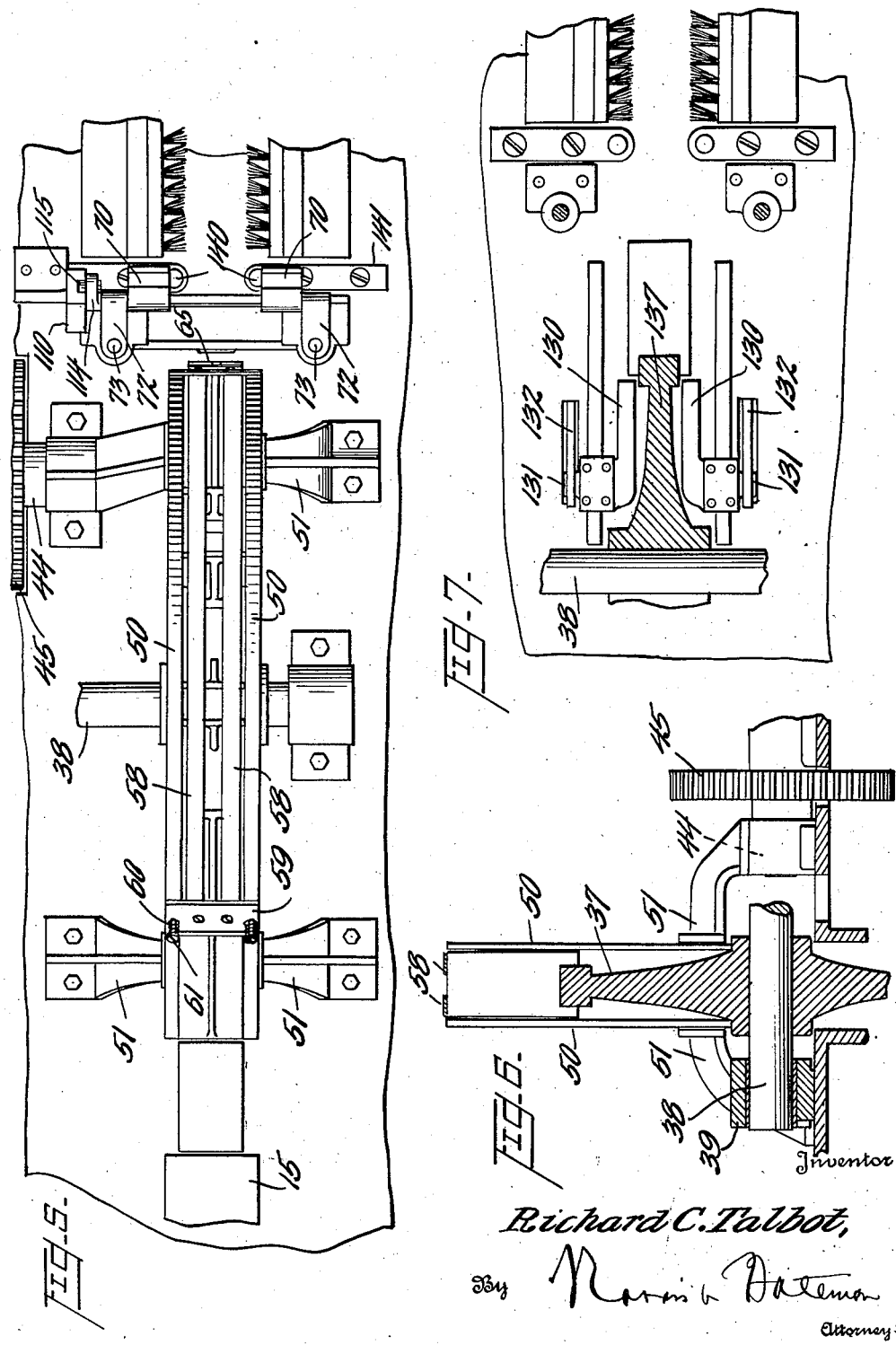

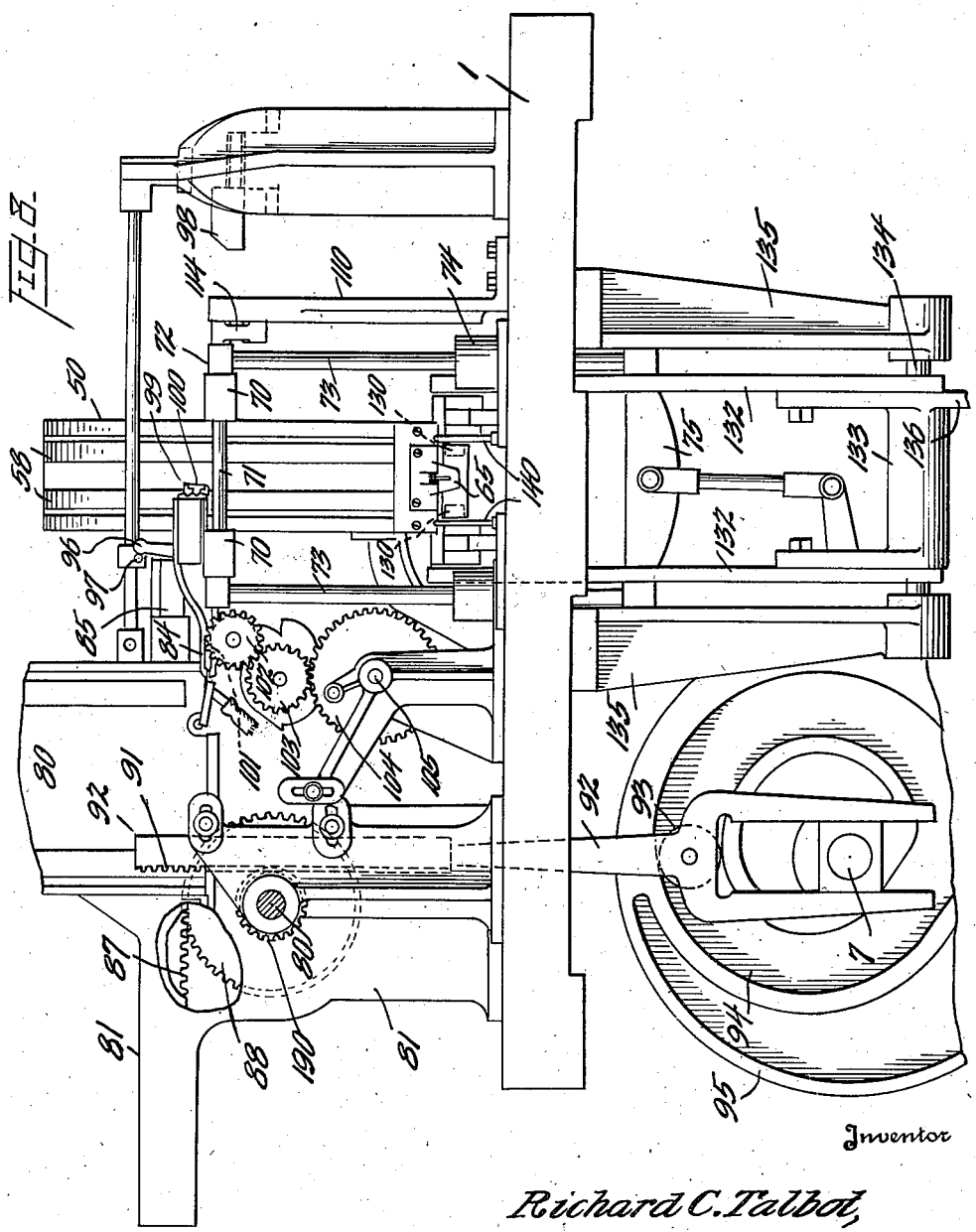

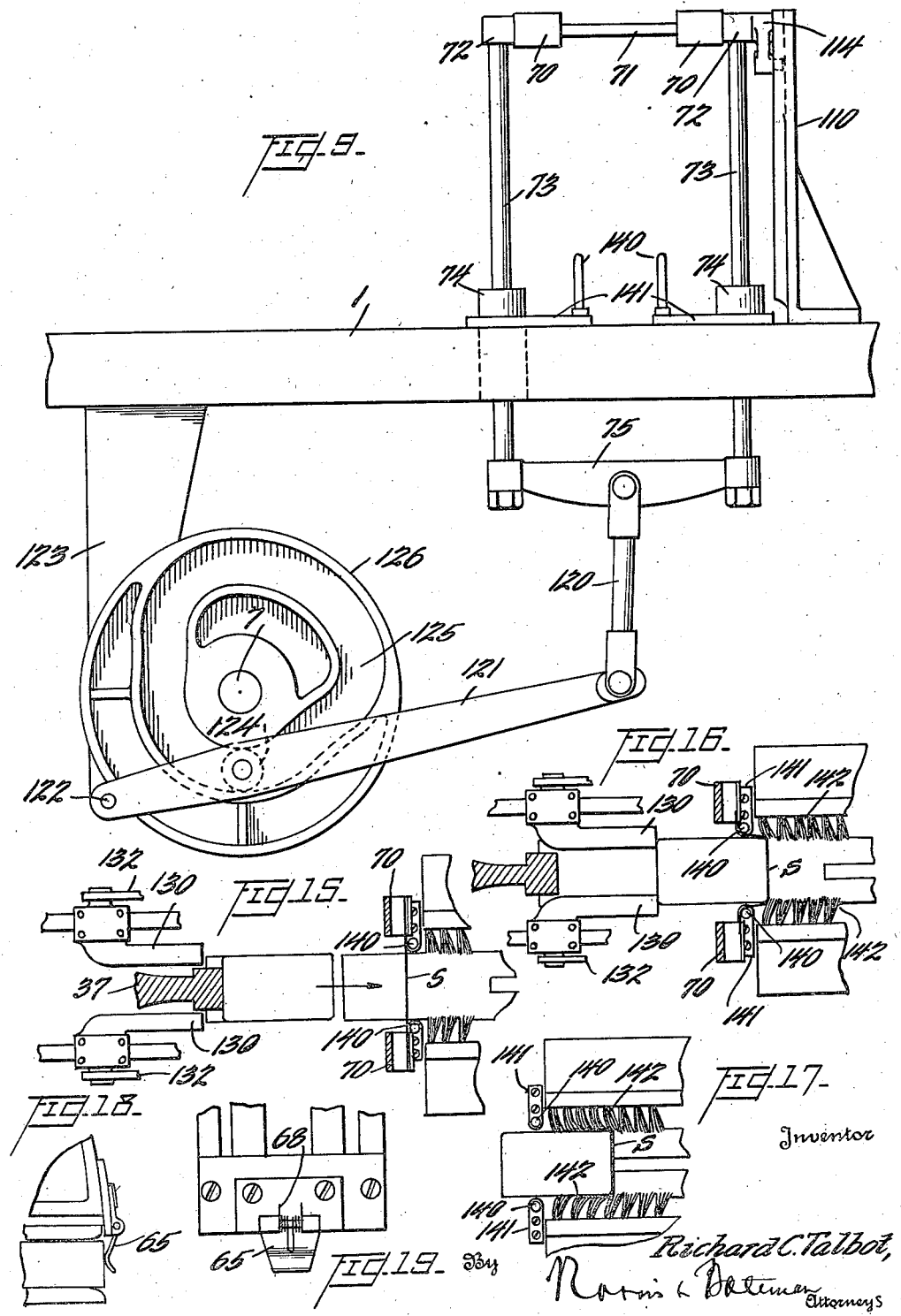

March 31, 1942.   R. C. TALBOT   2,277,801
LABELING AND STAMPING MACHINE
Filed Sept. 7, 1940   8 Sheets-Sheet 6
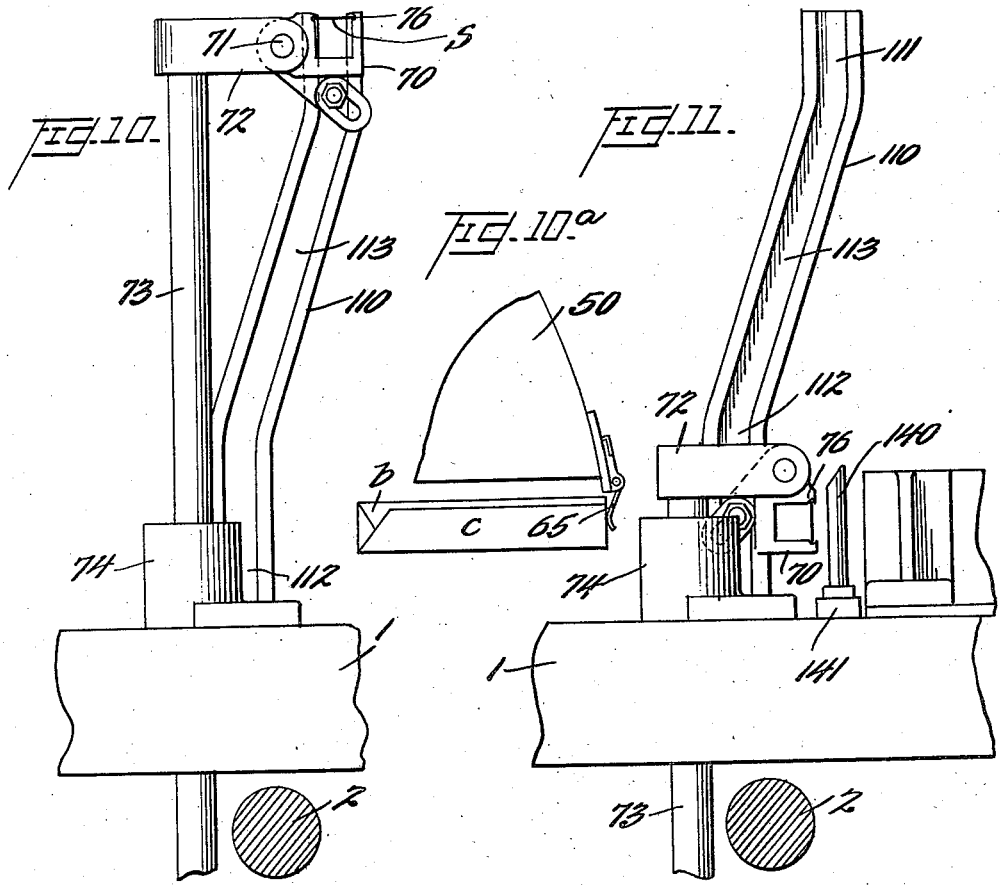
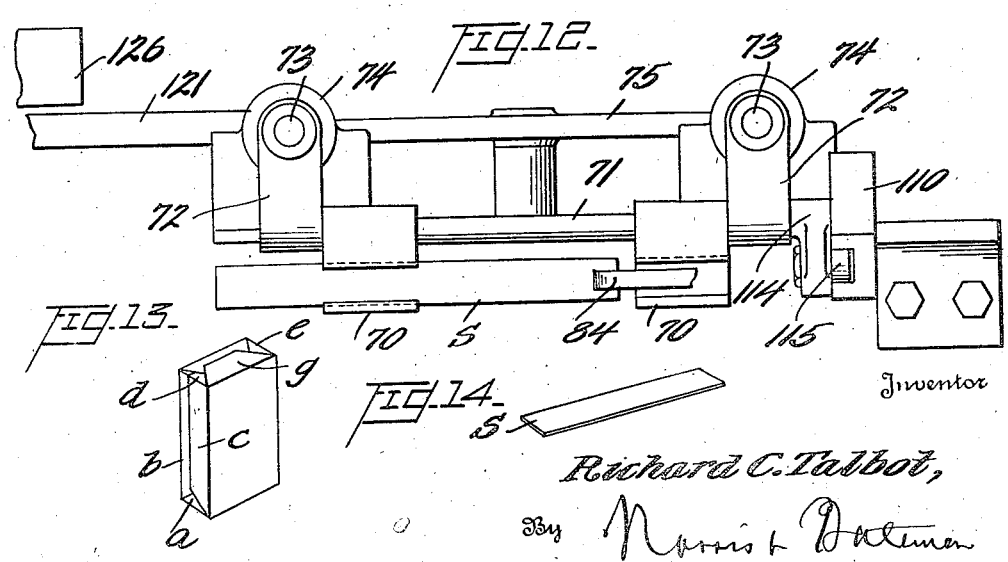

March 31, 1942.   R. C. TALBOT   2,277,801
LABELING AND STAMPING MACHINE
Filed Sept. 7, 1940   8 Sheets-Sheet 7
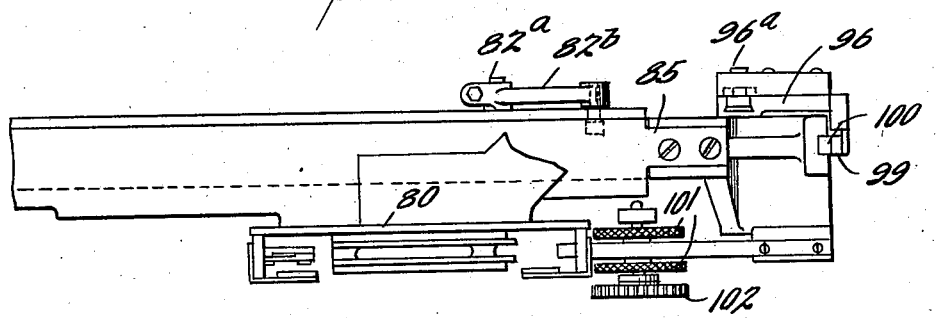
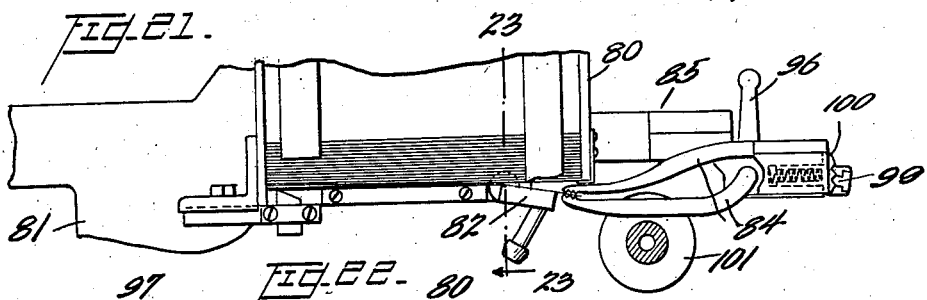
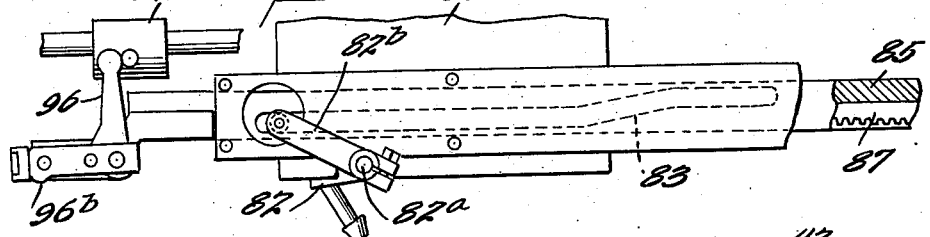
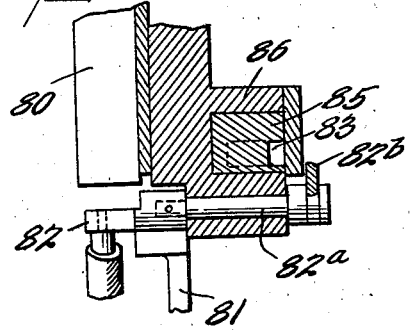
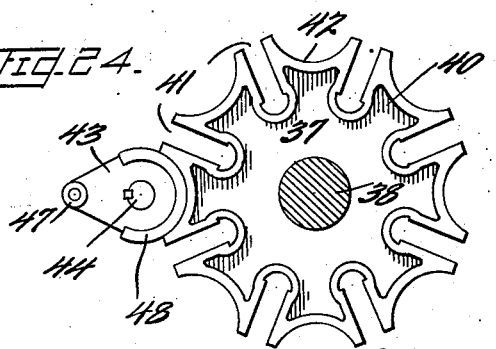
Inventor
Richard C. Talbot,
By Norris & Bateman
Attorneys March 31, 1942. R. C. TALBOT 2,277,801
LABELING AND STAMPING MACHINE
Filed Sept. 7, 1940 8 Sheets-Sheet 8
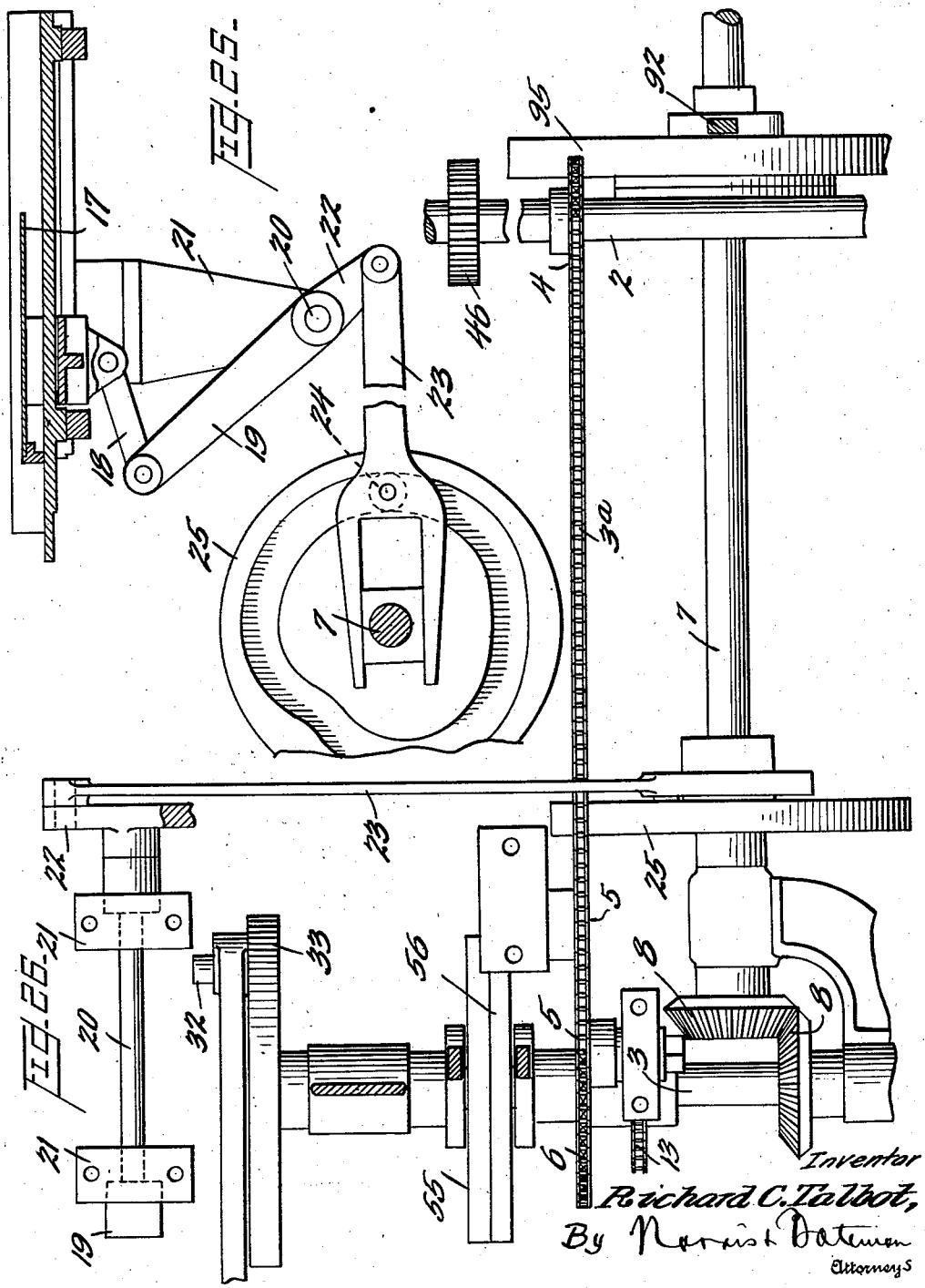

Patented Mar. 31, 1942

2,277,801

UNITED STATES PATENT OFFICE 2,277,801

LABELING AND STAMPING MACHINE

Richard C. Talbot, Durham, N. C., assignor to Wright's Automatic Tobacco Packing Machine Company, Durham, N. C., a corporation of North Carolina Application September 7, 1940, Serial No. 355,858

14 Claims. (Cl. 216—53)

The present invention relates to labeling and stamping machines, and more especially to machines for applying labels or similar outer wrappers and also stamps, such as revenue stamps, to packages as, for example, tobacco pouches, it providing certain improvements upon labeling and stamping machine such as that shown and described in U. S. Letters Patent No. 1,698,585 granted Jan. 8, 1929.

The primary object of the present invention is to provide novel and improved means for feeding and applying stamps to the packages whereby the stamps are applied more evenly and uniformly thereto.

To these and other ends, the invention consists in certain improvements and combinations and arrangements of parts, all as will be hereinafter more fully described, the features of novelty being pointed out more particularly in the claims at the end of this specification.

In the accompanying drawings:

Fig. 1 is a side elevation of a labeling and stamping machine embodying the present invention;

Fig. 2 is a top plan view of the machine shown in Fig. 1;

Fig. 3 is a side elevation, on an enlarged scale, of the mold wheel and cooperative mechanisms;

Fig. 3a represents a vertical section through the upper side of the mold wheel, showing diagrammatically the improved means for holding the folded ends of the packages in folded condition;

Fig. 4 is a detail section taken on the line 4—4 in Fig. 3;

Fig. 5 is a top plan view of the mold wheel and cooperative parts as shown in Fig. 3;

Fig. 6 is a vertical section taken on the line 6—6 in Fig. 3;

Fig. 7 is a detail horizontal section taken on the line 7—7 in Fig. 3;

Fig. 8 represents a vertical transverse section, taken on the line 8—8 in Fig. 2;

Fig. 9 is a detail view, on an enlarged scale, of the stamp feeding means;

Fig. 10 is an elevation of the stamp feeding means as viewed from the left in Fig. 9, the stamp feeding clips being shown in elevated stamp receiving position;

Fig. 10a is a fragmentary view showing a package in position for ejection from the mold wheel;

Fig. 11 is a view similar to Fig. 10, but showing the stamp clips lowered to present the stamp to a package when ejected from the mold wheel;

Fig. 12 is a top plan view of a portion of the structure shown in Fig. 9;

Fig. 13 is a perspective view of one of the packages, showing the manner of folding the same;

Fig. 14 is a perspective view of one of the stamps to be applied to the package;

Figs. 15, 16 and 17 are diagrammatic views, illustrating different stages in the application of a stamp to a package;

Fig. 18 is a side elevation, and Fig. 19 is an end view of the presser finger which applies a final press to the folds closing the top of the package, immediately prior to the application of the stamp thereto;

Fig. 20 is a top plan view and Figs. 21 and 22 are respectively front and rear elevations of the stamp magazine and gripper for supplying the stamps and introducing them into the stamp clips;

Fig. 23 is a detail vertical section taken on the line 23—23 in Fig. 21;

Fig. 24 is a detail view of the Geneva movement which intermittently rotates and indexes the mold wheel;

Fig. 25 is a detail vertical section of the ejector which removes the packages from the package magazine and places them in position to receive the labels or outer wrappers; and Fig. 26 is a top plan view of the driving shafts for the machine.

Similar parts are designated by the same reference characters in the several views.

Labeling and stamping machines embodying the present invention are adapted for use generally where it is desired to apply a label or a similar outer wrapper to a package and to affix a stamp or its equivalent to the folded or closed end of the label or wrapper. The invention is particularly applicable to the labeling of tobacco pouches and the affixing of revenue stamps thereto, and the machine shown in the accompanying drawings is adapted to that particular use. It is to be understood however that the invention is not restricted to the particular construction shown as equivalent constructions are contemplated and such will be included within the scope of the claims.

In the present instance, the improvements are shown applied to a labeling and stamping machine of the same general construction as that disclosed in the patent hereinbefore mentioned, the present invention providing certain improvements upon a machine of that type, as will be hereinafter described.

The machine as shown comprises a bed 1 supported on suitable legs and having a main driving shaft 2 mounted in suitable bearings beneath the bed, a countershaft 3 which is suitably driven from the shaft 2 as by a chain 3ª which cooperates with a sprocket wheel 4 on the shaft 2 and passes around idler sprockets 5 and cooperates with a sprocket wheel 6 fixed on the shaft 3, the latter shaft being mounted in suitable bearings beneath the bed. The shafts 2 and 3 are arranged transversely of the bed, and a longitudinal shaft 7 is also mounted in suitable bearings beneath the bed, this shaft being driven by bevel gears 8 from the shaft 3. The main shaft 2 may be driven continuously by a belt or other suitable means from any appropriate source of power, and the shafts 3 and 7 will be driven continuously therefrom.

Labels or wrappers are fed to one end of the machine by any suitable means such for example as that shown in the patent hereinbefore referred to, it being believed sufficient for the purpose of the present invention to describe the means shown for this purpose as comprising a runway 10 along which labels or wrappers may be fed as by a conveyor 11 and to which paste may be applied to the appropriate portions of the labels or wrappers by any suitable and well known devices. The label feeding means may be driven by a chain 12 which cooperates with a sprocket wheel 13 fixed on the shaft 3. The labels are fed into a vertical chute 14 so that they stand in upright position, supported on their lower edges, the middle of the label while in such position being opposite to a plunger 15 which is mounted to reciprocate on the upper side of the table.

A magazine 16 is mounted on the table and is adapted to contain a stack of packages made up for example of charges of tobacco contained in inner wrappers, the stack of packages in this magazine resting on the bottom of this magazine with its lowermost package in front of a slide 17. This slide is suitably guided to reciprocate transversely of the table and of the direction of reciprocation of the plunger 15, and it is reciprocated by any suitable means such as a link 18 which is pivotally connected thereto at one end and is pivotally connected at its other end to an arm 19 fixed on a shaft 20, the latter being journalled in suitable bearings 21 fixed to the underside of the table and having an arm 22 fixed on its other end which is pivotally connected to a cam yoke 23, the latter carrying a roller 24 which cooperates with a cam groove in the face of a cam 25, the latter being fixed on the shaft 7. The slide 17, at each reciprocation thereof, will eject the lowermost package in the magazine 16, and the operation of this slide is timed so that the package thus ejected will be brought into a position in front of the plunger 15 while the latter is retracted. The plunger 15 is advanced while the slide 17 is retracted, by a link 26 which is pivotally connected at one end to the plunger and is pivotally connected at its other end to one end of a lever 27, this lever being pivoted at 28 to a bracket 29 fixed to one of the legs of the table and the intermediate portion of the lever 27 is pivotally connected at 30 to one end of a connecting rod 31, the other end of this rod being connected to a crank pin 32, the latter being fixed to a side of a cam 33 which is fixed on the shaft 3. By this arrangement, which is similar to that shown and described in the patent hereinbefore mentioned, a label or wrapper will be fed into upright position in the chute 14, and the slide 17 will feed a package from the bottom of the magazine 16 to a position between the upright wrapper and the plunger 15 while the latter is retracted, and after the package feeding slide 17 is retracted, the plunger 15 will advance, thereby pushing the package endwise against the middle of the upright label or wrapper into a housing 35, thus doubling the label or wrapper upon the upper and lower sides of the package with the longitudinal edges of the label projecting beyond the sides of the package. As the package, with the label or wrapper doubled thereon, is advanced by the plunger 15 through the housing 35, end folders, like those shown in the patent hereinbefore mentioned, fold the lower corners a (Fig. 13) of the label, and other folders in the housing 35 make the longitudinal side folds b, the longitudinal edges of the upper portion of the label still projecting in unfolded relation from the longitudinal edges of the package, substantially as in the patent hereinbefore mentioned.

According to the present invention, the package, with the label or wrapper thus partially folded thereon, is introduced by the plunger 15 into one of the packets 36 of a rotatable mold wheel 37. This mold wheel is mounted on a shaft 38 on which it is fixed, this shaft being journalled in suitable bearings 39 on the table, and the mold wheel is provided with means for rotating it intermittently and to a suitable extent at each step to bring the pockets 36 thereon successively into package receiving position. As shown, a Geneva movement is employed which may be of any suitable or well known type, it comprising for example a female member 40 fixed on the shaft 38 and having a series of radial slots 41 corresponding in number to the number of pockets on the mold wheel, and intervening arcuate portions 42, and a male member 43 which is fixed on a shaft 44 journalled in suitable bearings on the table, this shaft being driven continuously by a gear 45 fixed thereon and meshing with a gear 46 on the main driving shaft 2. The member 43 carries a roller 47 which, during each revolution of this Geneva member, enters one of the slots 41 in the Geneva member 40 and rotates the latter through one step, following which a concentric rim 48 on the Geneva member 43 enters the adjacent arcuate portion 42 of the member 40 and cooperates with the latter to lock it in package receiving position until the next advance thereof.

As each pocket in the mold wheel is brought into package receiving position, a package, with the partially folded label thereon, is introduced into it by the plunger 15. At this time, the longitudinal edges of the upper portion of the label overlying the top of the package project beyond the longitudinal edges of the package, but during the following advance of the mold wheel, these projecting portions of the label engage a pair of folding plates 50 which are each of substantially semi-circular form and are supported in close relation to the sides of the pockets at the upper side of the mold wheel by brackets 51 which are fixed on the table. These projecting edges of the label are thus folded against the longitudinal sides of the package to form the folds c which overlie the previously made folds b and become secured thereto by adhesive previously supplied to the appropriate portions of the label.

After the package, with its side folds thus completed, is advanced a step by the mold wheel, its unfolded top or upper end is brought into cooperation with a pair of folders 53 which make the edge folds d and e at the top of the package, and a folder 54 which makes the fold f in the top or upper end of the package, these folders being like those shown and described in detail in the patent hereinbefore mentioned and to which reference is made for a detailed illustration and description thereof. These top folders are operated at appropriate times by cams 55 and 56 fixed on the shaft 3.

The next step in the advance of the mold wheel carries the package from the end folding station just described, beneath the plate 57 which spans and is fixed to the outer peripheral edges of the plates 50 so that it engages the remaining unfolded end portion of the label and makes the final fold g which overlies and becomes attached to the previously made fold f by adhesive previously applied to the appropriate portion of the label.

Each package with a label thereon is carried by the mold wheel through a half revolution thereof so that it will be discharged from the side thereof diametrically opposite to that at which it was received, and during the rotation of the mold wheel, the plates 50 which lie close to the sides of the mold wheel pockets will firmly hold the folds c in folded position so that they will become permanently affixed by the adhesive to the underlying folds, and in order to firmly hold the flap g at the top or upper end of the label in folded position and thus insure permanent affixing of this fold to the underlying folds by the adhesive, flexible strips 58 are extended around the upper portion of the periphery of the mold wheel so that the edges of the pockets thereof will ride beneath these strips and these strips will bear on the end fold g and thereby insure firm affixing thereof in folded position. As shown, these flexible strips 58 are attached at one end to the plate 57 by a transverse strip 59 which is riveted or otherwise fixed to these ends of the strips 58, the strip 59 being pressed yieldingly toward the plate 57 by a pair of compression springs 60 which encircle studs 61 which are fixed in the plate 57 and serve to guide the cross strip 59 in its movements toward and from the mold wheel. The other ends of the flexible strips 58 are attached to a plate 62 the latter spanning the segmental folding plates 50 and being fixed thereto as by screws 63, the plate 62 being located immediately above the point of discharge of the packages from the mold wheel.

The present invention provides means for imposing a final press upon the folds at the top or upper end of the package immediately before the latter is ejected from the mold wheel, thereby insuring maintenance of the folds and providing a flat smooth surface over which the revenue stamp may be applied. This pressing device comprises a finger 65 which is pivoted by a hinge pin 66 on a plate 67 which is secured by screws or other suitable means to the plate 62, a spring 68 being provided which acts to swing the finger 65 downwardly and against the folded end of a package as the respective mold wheel pocket is brought into package ejecting position. The pivot 66 for this spring finger is located above the path of travel of the package during its ejection from the mold wheel, so that it will not interfere with such ejection.

The present invention provides novel and improved means for applying a revenue stamp to each package as it is delivered from the mold wheel. Such means comprises a pair of clips 70 which are fixed on a shaft 71 at a distance apart somewhat greater than that of the width of the package, the shaft 71 being journalled in bearings 72 on the upper ends of a pair of rods 73, the latter being slidable vertically through bearings 74 mounted in the top of the table, the lower ends of these rods being rigidly connected by a cross bar 75. The clips 70 are each of channel shape in cross section, their opposite sides being formed with grooves or channels 76 which are spaced apart a distance slightly greater than the width of the revenue stamp S or the equivalent thereof which is to be applied to the closed end of the package. The grooves 76 in both clips 70 are in alignment so that the stamp is introduced into the clips by a movement of the stamp endwise of the clips, the intermediate portion of the stamp spanning the space between the clips.

Any suitable means may be employed for feeding the stamps to the clips, the means shown for this purpose in the present instance comprising a magazine 80 adapted to contain a stack of the stamps, this magazine being mounted in a suitable bracket 81 fixed to the top of the table and having a pivoted suction pad 82 connected to any suitable source of suction and fixed to a shaft 82$^a$ having an arm 82$^b$ fixed thereon and provided with a roller operative by a cam groove 83 in a reciprocatory gripper bar 85 to bring an end of the lowermost stamp in the magazine into position to be engaged by a gripper 84. The gripper 84 is carried by the bar 85 which is guided to reciprocate in a casing 86 and is provided with a rack 87 which meshes with a gear 88, the latter being fixed to a shaft 89 to which a pinion 90 is fixed, and this pinion meshes with a rack 91 on the upper end of a cam yoke 92, the latter carrying a roller 93 which travels in the groove 94 of a cam 95 fixed on the shaft 7. By this arrangement, each revolution of the cam 95 will impart a to-and-fro reciprocation to the bar 85 and the gripper thereon, and as the gripper approaches stamp receiving position it is closed, by the engagement of an arm 96 fixed on a shaft 96$^a$ which carries the lower gripper member, with an abutment 97, thereby operating the lower gripper member to grip an end of the lowermost stamp in the magazine, and as the gripper is retracted it will travel in the channels of the clips 70, thereby drawing the stamp endwise with its edges engaged and guided by the grooves 76 in the clips. When the gripper approaches the limit of its stamp feeding movement, the arm 96 is again operated by a cam 96$^b$ thereon which engages a fixed abutment 98 to open the gripper and thereby release the stamp. At the same time, the suction pad 82 rises to engage the underside of the lowest stamp in the magazine. A pawl 99 on the arm 96 cooperates with one or another of a pair of notches in a spring pressed plunger 100 carried by the gripper bar to hold the gripper open or closed until operated by one or the other of the abutments. During the feeding of each stamp from the magazine to the clips, adhesive is applied to the underside of the stamp by a gum roll 101 over which the stamp is drawn by the gripper, the gum roll being driven by gears 102, 103 and 104, the latter gear being fixed on a shaft 105 which has a sprocket wheel 106 fixed thereon, this sprocket wheel being connected by a chain 107 to a ratchet sprocket wheel 108 fixed on the shaft 89 so that the gum applying means will be driven from the latter shaft as each stamp is drawn over the gum roll 101, and will remain idle during the return strokes of the gripper.

Although the clips 70 are positioned with their channel sides uppermost so that the stamp will be fed to the clips while the stamp is in a horizontal plane, as shown in Fig. 10, or substantially so, the clips are rotated through a partial revolution, preferably a quarter turn, to bring the stamp into a substantially vertical plane as the stamp is brought into a position to be applied to the package, as shown in Fig. 11. The means for thus turning or rotating the clips comprises a cam 110 which is bolted or otherwise fixed to the top of the table, this cam comprising vertical upper and lower portions 111 and 112 and an inclined portion 113 connecting them. The shaft 71 to which the clips 70 are fixed, has a crank arm 114 fixed thereon and this crank arm carries a roller 115 which travels in the groove of the cam 110 as the clips and the shaft 71 carrying them, is raised or lowered. As shown in Fig. 10, the roller 115 is in the upper portion 111 of the cam groove so that the channel side of the clips 70 is upturned, but as the clips are lowered, the roller 115 travels in the inclined portion 113 of the cam, thereby rotating the clips through a quarter revolution and bringing them into the position shown in Fig. 11. When the clips reach the latter position, the stamp engaged in the grooves therein lies in a vertical plane and in alignment with the pocket in the mold wheel which is in ejecting position, so that the stamp will extend across the path of a package as it is ejected from the mold wheel. The clips are raised and lowered at appropriate times by a link 120 which is pivotally connected at one end to the bar 75 and at its other end to a lever 121, the latter being pivoted at 122 on a bracket 123 fixed to the underside of the table and carrying a roller 124 which travels in the groove 125 of a cam 126, the latter being fixed on the shaft 7.

As each pocket in the mold wheel reaches ejecting position, the package therein is ejected endwise by a pair of ejectors 130 which are pivotally connected by pins 131 to the arms 132 of a yoke 133, the latter being mounted rotatably on a shaft 134 supported in bearings 135 fixed to the underside of the table and the yoke having an arm 136 fixed thereto and pivotally connected to a cam yoke 137, the latter carrying a roller 138 which operates in the groove 139 which is in the opposite side of the cam disk 33 from that to which the crank pin 22 is attached.

As the clips 70 descend, during the period the package ejectors 130 are retracted, thus turning or rotating the stamp S carried by them from the horizontal position shown in Fig. 10 to the vertical position shown in Fig. 11, the stamp is lowered into a position behind a pair of pins 140 which project upwardly from plates 141 secured to the upper side of the table, these pins being spaced apart a distance slightly greater than the width of the package. While the stamp is held in this position and immediately behind the pins 140, the ejectors 130 advance, thereby ejecting the package from the pocket in the mold wheel and bringing the folded or forward end of the package against the middle of the stamp while the stamp is stretched between the clips 70 as shown in Fig. 15. As the ejection of the package continues, the forward or folded end of the package engages the middle portion of the stamp between the clips 70 and pushes this portion of the stamp forwardly, as shown in Fig. 16, and in doing so, the end portions of the stamp are drawn around the pins 140 and are withdrawn endwise from the channels or grooves 76 in the clips, these pins and cooperating clips thus guiding the ends of the stamp so that they will be applied evenly and in longitudinal alignment with the side edges of the package. As the ejecting stroke of the ejectors 30 is completed, the package, with the stamp extending across its forward end and its ends lying against the side edges of the package, is pushed into a runway containing a pair of brushes 142 which brush the ends of the stamp against the side edges of the package, thereby bringing the adhesive coated ends of the stamp into intimate contact with the side edges of the package. The next succeeding package ejector from the mold wheel will advance the previously ejected package ahead of it between the brushes 142, a row of the stamped packages accumulating in the runway and the row being advanced each time a package is ejected from the mold wheel, and as the package is advanced along the runway past the brushes 142, they pass between a pair of electrical heaters 143 which engage the ends of the stamp and press them firmly against the side edges of the packages and accelerate the drying of the ends of the gummed stamp. Another set of brushes like the brushes 142 may be provided in the runway beyond the heaters, such an arrangement of brushes and electrical heaters being similar to that disclosed in Patent No. 1,188,747. When the stamped packages are delivered from the runway, as upon a table, they are ready to be packed in cartons or otherwise disposed of.

The construction and mode of operation of the various elements of the machine having been described in detail, the general operation of the machine may be described as follows:

Assuming that the shaft 2 and the shafts 3 and 7 driven therefrom are rotated continuously from a suitable source of power, a package will be delivered from the package magazine 16 in front of the plunger 15 while the latter is retracted, and a label or outer wrapper with adhesive applied to the appropriate portions thereof will be fed into the chute 14 in front of the package. The plunger 15 then advances, causing the package to engage the label or wrapper and to receive the latter in folded relation as the package is pushed through the housing 15 during which the row of corner folds *a* and side folds *b* are made. This package thus advanced is pushed into a pocket of the mold wheel which is then in alignment with the direction of advance of the package. The mold wheel is then rotated a step causing the folding plates 50 at the sides of the mold wheel to engage the projecting edges of the label or wrapper and to fold them down against the side edges of the package to make the folds *c*, and to bring the upper unfolded end of the package into cooperative relation with the folders 53 and 54, and during the period of rest in the rotation of the mold wheel and while the package is in this position, the folds *d*, *e* and *f* are made in the label or outer wrapper of the package. The next step in the advance of the mold wheel carries the remaining projecting end of the label or outer wrapper beneath the stationary plate 57 at the periphery of the mold wheel, this plate making the final fold *g* in the label or wrapper, and during the remainder of a half revolution of the mold wheel to bring the package to ejecting position, the yielding or resilient strips 58 press on the folded top end of the package and thereby maintain the folds of the label or wrapper in folded position to insure securing or sealing thereof by adhesive previously applied to those portions of the label, and during this portion of the rotation of the mold wheel, the folds *c* of the label are held firmly against the opposite side edges of the package to insure the affixing thereof to the previously made folds *b* by the previously applied adhesive. As each package reaches ejecting position, the spring finger 65 snaps inwardly against the folded end of the package under the action of the spring 68, thereby imparting a final press to the folds of the label or wrapper to insure effective sealing of the label.

While the package ejectors 160 are retracted, the stamp clips 70, which have previously received a stamp from the stamp magazine 80 through the operation of the gripper 84, lowers the stamp into the path of ejection of the package from the mold wheel, and the ejectors 130 then advance to eject the package, causing it to engage the stamp and to cause the stamp to be applied thereto as previously described, after which the stamped packages, following their passage between the brushes 142 and heaters 143, are ready to be packed or otherwise disposed of.

By feeding the stamps into clips so that they will be guided by their edges, the stamps are accurately positioned relatively to the clips, and by transferring the stamps by the clips from the position in which the stamps are received to a position in the path of advance of the packages, application of the stamps evenly and uniformly to the packages is insured. As the ends of the stamps are guided and controlled by the clips during the application of the stamps to the packages, the stamp ends being withdrawn endwise from the clips while they are guided by their longitudinal edges which slide in the channels or grooves in the clips, the ends of the stamps will be made evenly against the longitudinal edges of the packages and in parallelism with the sides of the packages.

The resilient strips arranged peripherally of the mold wheel insure firm securing or sealing of the tops of the packages before the stamps are applied, and the spring finger which applies the final press to the folded top of the package further insures firm securing or sealing of the top of the package and leaves this portion of the package in a substantially flat form to neatly receive the stamp.

I claim:

1. In a machine of the class described, the combination of means for advancing a package, and means for supporting a stamp by its edges in the path of advance of the package for application thereto.

2. In a machine of the class described, the combination of means for advancing a package, and means for supporting a stamp by its edges in the path of advance of the package for application thereto and for guiding the ends of the stamp by their edges as the application of the stamp to the package proceeds.

3. In a machine of the class described, the combination of means for advancing a package, and clips for positioning a stamp in the path of the package for application thereto, said clips having channels therein to receive the edges of the stamp and to guide the stamp while being withdrawn therefrom.

4. In a machine of the class described, the combination of means for advancing a package, and a pair of alined clips for supporting a stamp by its ends and for positioning its intermediate portion in the path of the package, said clips having means engageable with the edges of the stamp ends to guide them during withdrawal from the clips.

5. In a machine of the class described, the combination of means for advancing a package, and a pair of channeled clips having grooves in their opposite walls to engage the edges of a stamp and thereby support it in the path of the package.

6. In a machine of the class described, the combination of means for advancing a package, and a pair of alined clips having opposed guides to engage the edges of a stamp extending longitudinally therein and support the stamp by its edges in the path of the package.

7. In a machine of the class described, the combination of means for advancing a package, a pair of alined clips for positioning a stamp in the path of the package, said clips having guide means extending longitudinally thereof, and means movable longitudinally of said clips for introducing a stamp therein with its longitudinal edges in engagement with the guide of the clips.

8. In a machine of the class described, the combination of means for advancing a package, means for feeding a stamp endwise, and a pair of clips having means to receive the edges of the stamp and thereby guide it in said clips and to guide the ends of the stamp during their withdrawal therefrom, said clips being movable from stamp receiving position to a position to present the stamp in the path of advance of the package for application thereto.

9. In a machine of the class described, the combination of means for advancing a package, means for feeding a stamp endwise, stamp transferring means engageable with the edges of a stamp fed from said feeding means for carrying a stamp from said feeding means to a position in the path of the package for application thereto, and means for rotating said stamp transferring means to turn the stamp about an axis longitudinal to its length while carrying the stamp to said position.

10. In a machine of the class described, the combination of means for advancing a package, means for feeding a stamp endwise, a pair of clips movable between said stamp feeding means and a position adjacent to the path of the packages and having means to receive and support a stamp, and means for rotating said clips into a position to receive a stamp from the feeding means while the stamp is in a horizontal plane and for rotating said clips to bring the stamp into a vertical plane and in the path of the package.

11. In a machine of the class described, the combination of means for advancing a package, means for feeding stamps endwise, a pair of reciprocatory and rotatable clips adapted to receive a stamp endwise and having means for supporting a stamp therein by its edges, and means for rotating said clips during their reciprocation to present them to the stamp feeding means to receive a stamp therefrom while the stamp lies in one plane and for rotating the clips to bring the stamp in another plane and present it in the path of the package for application thereto.

12. In a machine of the class described, the combination of means for advancing a package, a pair of clips having means for supporting the ends of a stamp by its edges and with its intermediate portion in the path of the package, and members spaced for the advance of the package between them and positioned to cooperate with the stamp to guide its ends into engagement with opposite sides of the package.

13. In a machine of the class described, the combination of means for advancing a package, a pair of clips having means for supporting the ends of a stamp by its edges and with its intermediate portion in the path of the package, and a pair of pins spaced apart a distance slightly greater than the width of the package for the passage of the package between them and cooperative with said clips to direct the ends of the stamp against opposite sides of the package.

14. In a machine of the class described, the combination of means for advancing a package, means for feeding a stamp-like strip, a pair of longitudinally alined and spaced members mounted for reciprocation in unison between said strip feeding means and a position adjacent to the path of the package and pivoted for rotation on an axis longitudinal to said members, said members having means for supporting a strip by its ends, and means for rotating said members during their reciprocation to present them to the feeding means to receive a strip therefrom while the strip lies in one plane and for rotating said members to turn the strip about an axis longitudinal to its length into another plane and position it in the path of the package for application thereto.

RICHARD C. TALBOT.